Patented Sept. 6, 1932

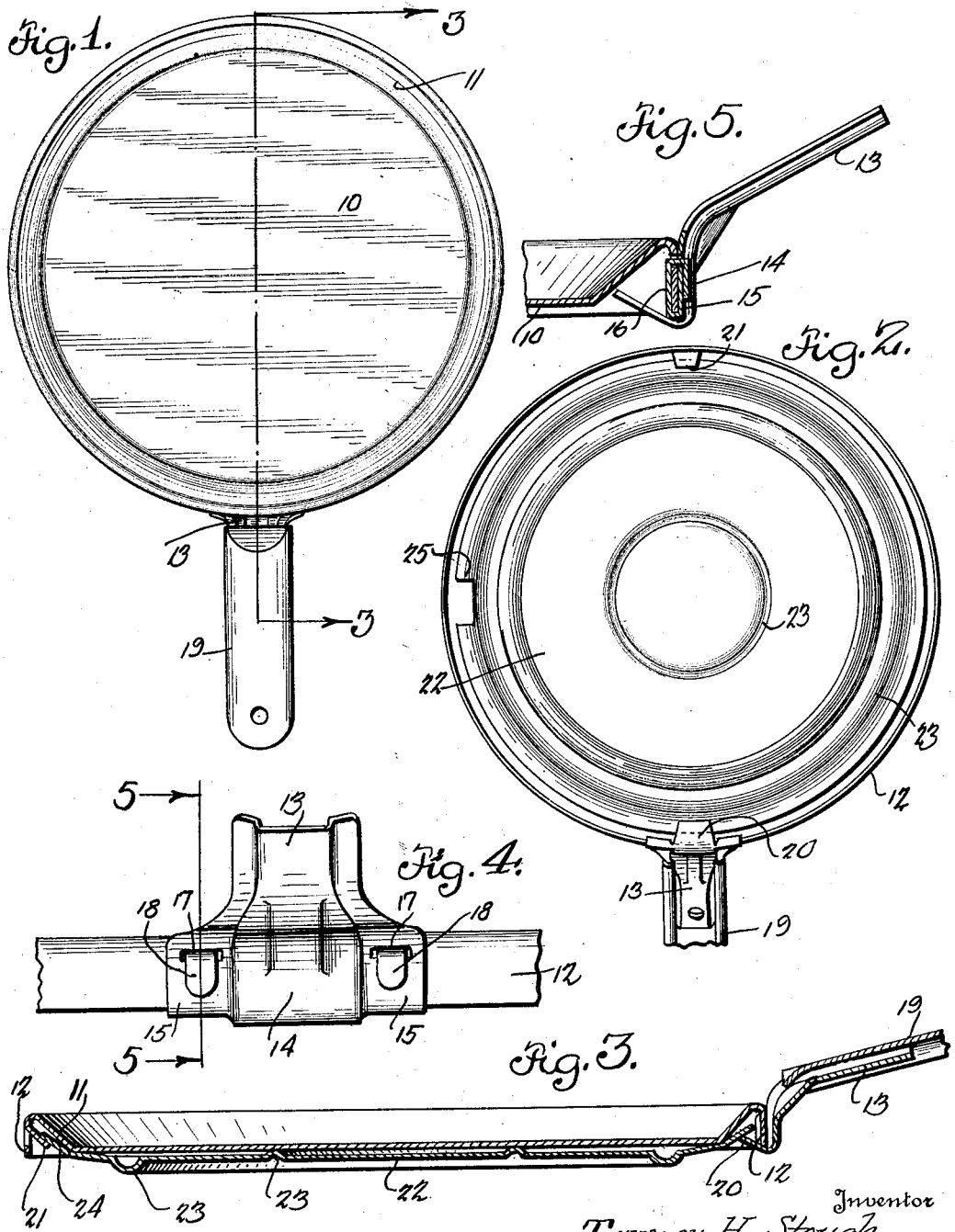

1,876,358

UNITED STATES PATENT OFFICE

TURNEY H. STOUGH, OF JEANNETTE, PENNSYLVANIA, ASSIGNOR TO JEANNETTE STEEL CORPORATION, OF JEANNETTE, PENNSYLVANIA

HOT PLATE ATTACHMENT FOR GRIDDLES

Application filed April 14, 1931. Serial No. 530,072.

This invention relates to certain new and useful improvements in hot plate attachment for griddles.

The primary object of the invention is to provide a hot plate attachment for griddles, such as frying pans or spiders wherein the hot plate in the form of a disk member is detachably engaged with the underside of the gridlle to provide an even distribution of heat over the griddle plate and to eliminate the burning of food while being cooked.

A further object of the invention is to provide a hot plate attachment for griddles and the like wherein cooperating lugs carried by the griddle and griddle handle operate for retaining the hot plate assembled in position on the griddle, novelty also residing in the manner of attaching the handle to the griddle body.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a combined griddle and hot plate constructed in accordance with the present invention;

Figure 2 is a bottom plan view of the same showing an interlocking connection between the hot plate and griddle;

Figure 3 is a vertical longitudinal sectional view, taken on line 3—3 of Figure 1, showing the cooperating lugs on the griddle body and handle for retaining the hot plate in position;

Figure 4 is an enlarged fragmentary elevational view showing the connection between the griddle body and handle; and Figure 5 is a detail sectional view taken on line 5—5 of Figure 4.

Referring more in detail to the accompanying drawing, the reference numeral 10 designates the bottom of a griddle, spider or the like, preferably of circular formation with an upwardly and outwardly flaring side wall 11 that carries a depending annular flange 12 spaced from the side wall 11. The handle attachment comprises a stub handle 13 inclined upwardly and outwardly from a wall comprising central and side sections 14 and 15 with the wall sections 14 and 15 flatly engaged with the adjacent portion of the annular flange 12. A finger 16 carried by the lower edge of each wall portion 15 is bent upwardly to engage the inner face of the adjacent portion of the flange 12 and is directed outwardly of the flange 12 to a slotted opening 17 to be bent downwardly as at 18 to overlie the outer side of the wall portion 15 as clearly shown in Figures 4 and 5, the fingers 16 and end extensions 18 locking the stub handle section 13 to the griddle body. A grip handle or shank 19 is attached to the stub handle 13 in any convenient manner, the same being a separate element to cause a reduction in heat transfer.

The lower edge of the intermediate wall portion 14 of the stub handle carries an upwardly and forwardly directed lug 20 extending into the space between the side wall 11 of the griddle and the annular flange 12 with its end spaced from the side wall 11 and a cooperating lug 21 is struck out from the flange 12 opposite the lug 20. The hot plate 22 is of disk formation with annular beads 23 formed therein providing a space between the bottom 10 and hot plate to effect a more even distribution of heat over the bottom 10, the peripheral edge 24 of the hot plate flaring upwardly into the space between the side wall 11 and flange 12. The flared edge 24 of the hot plate 22 is provided with an edge notch 25 to facilitate mounting of the hot plate upon the griddle body.

From the above detailed description of the device, it is believed that the construction and use thereof will at once be apparent, it being noted that in mounting the hot plate upon the griddle body, a portion of the flared edge 24 of the hot plate is preferably positioned beneath the handle lug 20 while the edge notch 25 therein is aligned with the flange lug 21 and when said hot plate is disposed inwardly of the two lugs 20 and 21, the same may be partially rotated as illustrated in Figure 2 to displace the notch 25 from either of the lugs 20 and 21 whereby the lugs retain the hot plate in position.

While there is herein shown and described the preferred embodiment of the invention, it is nevertheless to be understood that minor changes may be made therein without departing from the spirit and scope of the invention as claimed.

I claim:—

1. A hot plate attachment for griddles and the like comprising a griddle having a flaring side wall and a depending annular flange forming a pocket between the wall and flange, a hot plate detachably engaged with the griddle, an upwardly directed peripheral edge on the hot plate extending into the pocket, said hot plate having a marginal recess therein, and lugs associated with the flange and engaged with the hot plate by passage through the recess for retaining the hot plate in position on the griddle.

2. A hot plate attachment for griddles and the like comprising a griddle having a flaring side wall and a depending annular flange forming a pocket between the wall and flange and a hot plate detachably engaged with the griddle with the peripheral edge of the hot plate extending into the pocket, and a handle embodying a wall section flatly engaged with a part of the flange and tongue extensions on the wall section interlockingly engaged with the flange.

3. A hot plate attachment for griddles and the like comprising a griddle having a flaring side wall and a depending annular flange forming a pocket between the wall and flange and a hot plate detachably engaged with the griddle with the peripheral edge of the hot plate extending into the pocket, said hot plate having a marginal recess therein, lugs associated with the flange and engaged with the hot plate by passage through the recess for retaining the hot plate in position on the griddle, and a handle embodying a wall section flatly engaged with a part of the flange and tongue extensions on the wall section interlockingly engaged with the flange.

4. A hot plate attachment for griddles and the like comprising a griddle having a flaring side wall and a depending annular flange forming a pocket between the wall and flange and a hot plate detachably engaged with the griddle with the peripheral edge of the hot plate extending into the pocket, and a handle embodying a wall section flatly engaged with the outer side of a part of the flange and having openings therein alined with openings in the flange and locking tongue extensions on the wall section engaged with the inner and outer faces of the flange and wall section respectively and passed through said openings.

5. A hot plate attachment for griddles and the like comprising a griddle having a flaring side wall and a depending annular flange forming a pocket between the wall and flange and a hot plate detachably engaged with the griddle with the peripheral edge of the hot plate extending into the pocket, said hot plate having a marginal recess therein, lugs associated with the flange and engaged with the hot plate by passage through the recess for retaining the hot plate in position on the griddle, and a handle embodying a wall section flatly engaged with the outer side of a part of the flange and having openings therein alined with openings in the flange and locking tongue extensions on the wall section engaged with the inner and outer faces of the flange and wall section respectively and passed through said openings.

6. A hot plate attachment for griddles and the like comprising a griddle having a flaring side wall and a depending annular flange forming a pocket between the wall and flange and a hot plate detachably engaged with the griddle with the peripheral edge of the hot plate extending into the pocket, said hot plate having a marginal recess therein, lugs associated with the flange and engaged with the hot plate by passage through the recess for retaining the hot plate in position on the griddle, and a handle embodying a wall section flatly engaged with the outer side of a part of the flange and having openings therein alined with openings in the flange and locking tongue extensions on the wall section engaged with the inner and outer faces of the flange and wall section respectively and passed through said openings, and one of said lugs being carried by the handle.

In testimony whereof I affix my signature.

TURNEY H. STOUGH.